(12) United States Patent
Bodin

(10) Patent No.: US 9,505,443 B2
(45) Date of Patent: Nov. 29, 2016

(54) METHOD OF HOT-STAMPING AND HARDENING AN OBJECT FROM A METAL SHEET, AND A B-PILLAR FOR A VEHICLE

(75) Inventor: Hans Bodin, Sunderbyn (SE)

(73) Assignee: Gestamp Hardtech AB, Lulea (SE)

( * ) Notice: Subject to any disclaimer, the term of this patent is extended or adjusted under 35 U.S.C. 154(b) by 1543 days.

(21) Appl. No.: 12/310,271

(22) PCT Filed: Aug. 17, 2007

(86) PCT No.: PCT/SE2007/000732
§ 371 (c)(1),
(2), (4) Date: Feb. 17, 2009

(87) PCT Pub. No.: WO2008/024042
PCT Pub. Date: Feb. 28, 2008

(65) Prior Publication Data
US 2009/0250967 A1    Oct. 8, 2009

(30) Foreign Application Priority Data

Aug. 25, 2006   (SE) ........................................ 0601735

(51) Int. Cl.
*B62D 25/04*   (2006.01)
*B21D 53/88*   (2006.01)

(52) U.S. Cl.
CPC .............. *B62D 25/04* (2013.01); *B21D 53/88* (2013.01)

(58) Field of Classification Search
CPC ................................ B62D 25/04; B21D 53/88
USPC .............. 29/897.2, 505; 72/342.7, 349, 363, 72/379.2, 700; 148/533; 296/187.01
See application file for complete search history.

(56) References Cited

U.S. PATENT DOCUMENTS

| | | | |
|---|---|---|---|
| 3,703,093 A * | 11/1972 | Komatsu et al. | ............ 72/342.4 |
| 3,728,881 A * | 4/1973 | Coop | ................. 72/52 |
| 5,431,445 A | 7/1995 | Wheatley | |
| 5,492,207 A | 2/1996 | Clausen | |
| 5,789,718 A * | 8/1998 | Fukushima et al. | ............ 219/83 |
| 6,350,533 B1 * | 2/2002 | Goto et al. | .................... 428/615 |
| 6,509,541 B2 * | 1/2003 | Jung et al. | .................... 219/91.2 |
| 6,524,404 B2 | 2/2003 | Gehringhoff et al. | |
| 6,536,254 B1 | 3/2003 | Kawalla et al. | |
| 6,786,101 B2 * | 9/2004 | Iwai et al. | ....................... 73/850 |
| 6,799,450 B2 * | 10/2004 | Brinas et al. | ................. 72/342.2 |
| 6,820,924 B2 | 11/2004 | Caliskan et al. | |
| 6,825,442 B2 * | 11/2004 | Schroth et al. | ...... 219/137 WM |
| 6,903,296 B2 | 6/2005 | Gomez | |
| 6,994,350 B2 | 2/2006 | Krajewski et al. | |
| 7,181,948 B2 | 2/2007 | Arns | |
| 7,213,521 B1 * | 5/2007 | Dabezies et al. | ............. 105/401 |

(Continued)

FOREIGN PATENT DOCUMENTS

| | | |
|---|---|---|
| DE | 4307563 A1 | 9/1993 |
| DE | 19835997 A1 | 2/2000 |

(Continued)

OTHER PUBLICATIONS

EP2228459 Translation Document.*

*Primary Examiner* — David Bryant
(74) *Attorney, Agent, or Firm* — Mark P. Stone

(57) ABSTRACT

A B-pillar for a vehicle is made by the press-hardening method. The blank is made by placing together two blank elements (20,21) with an overlap (23) and welding the elements together before the shaping process.

17 Claims, 2 Drawing Sheets

(56) References Cited

U.S. PATENT DOCUMENTS

| | | |
|---|---|---|
| 7,310,878 B2 * | 12/2007 | Chernoff et al. ............ 29/897.2 |
| 7,546,755 B2 | 6/2009 | Arns |
| 7,857,377 B2 * | 12/2010 | Chen et al. ............. 296/203.03 |
| 8,382,199 B2 | 2/2013 | Bodin |
| 2002/0104591 A1 | 8/2002 | Gehringhoff et al. |
| 2004/0159378 A1 | 8/2004 | Gehringhoff |
| 2008/0206594 A1 * | 8/2008 | Fukuda et al. ................ 428/653 |
| 2010/0084892 A1 | 4/2010 | Yoshida et al. |
| 2012/0186705 A1 * | 7/2012 | Sikora et al. ................ 148/516 |
| 2012/0304448 A1 * | 12/2012 | Hartmann et al. ......... 29/525.06 |

FOREIGN PATENT DOCUMENTS

| | | | |
|---|---|---|---|
| DE | 200 14 361 (U1) | 11/2000 | |
| DE | 10353479 A1 | 3/2005 | |
| DE | EP2228459 * | 9/2010 | ............ C21D 1/973 |
| EP | 1195208 A2 | 4/2002 | |
| GB | 2281047 A | 2/1995 | |
| WO | WO 00/21695 A1 | 4/2000 | |
| WO | WO 2006050688 | 5/2006 | |

* cited by examiner

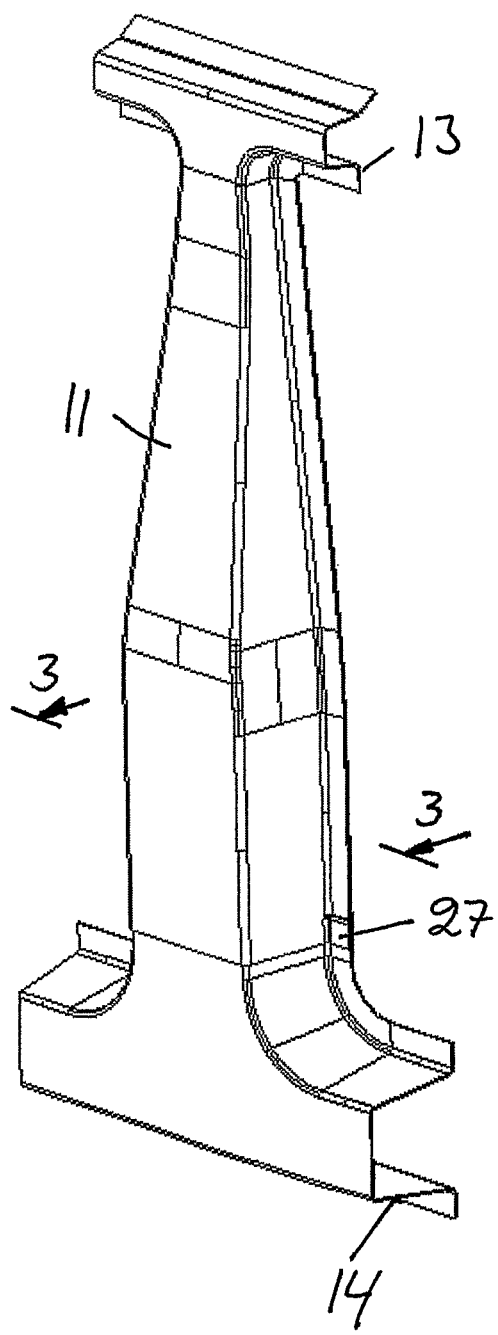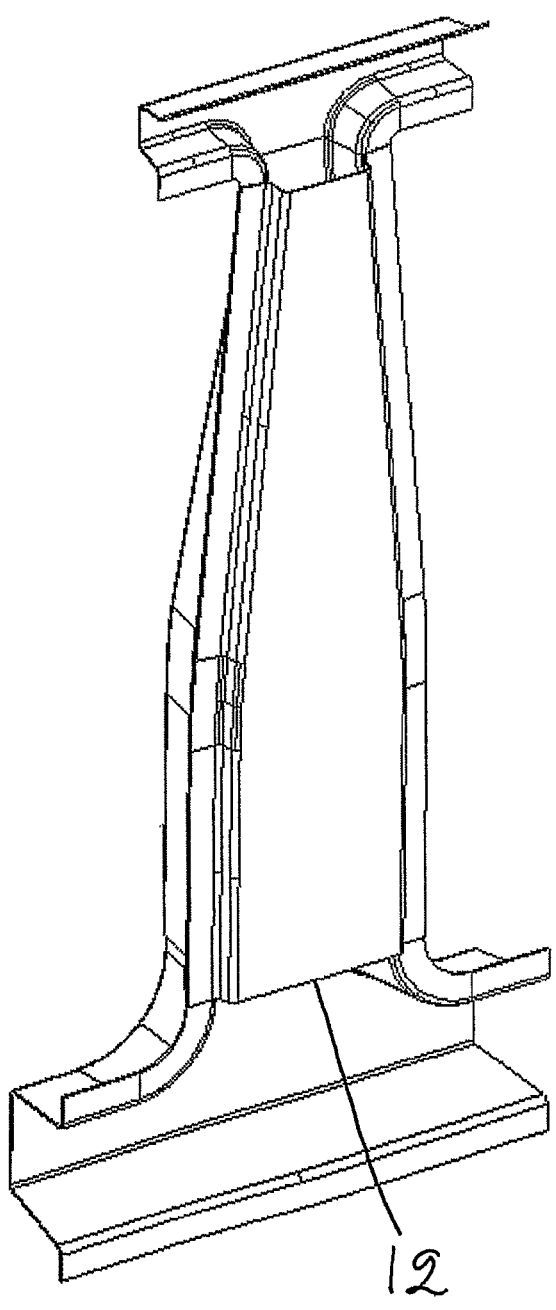

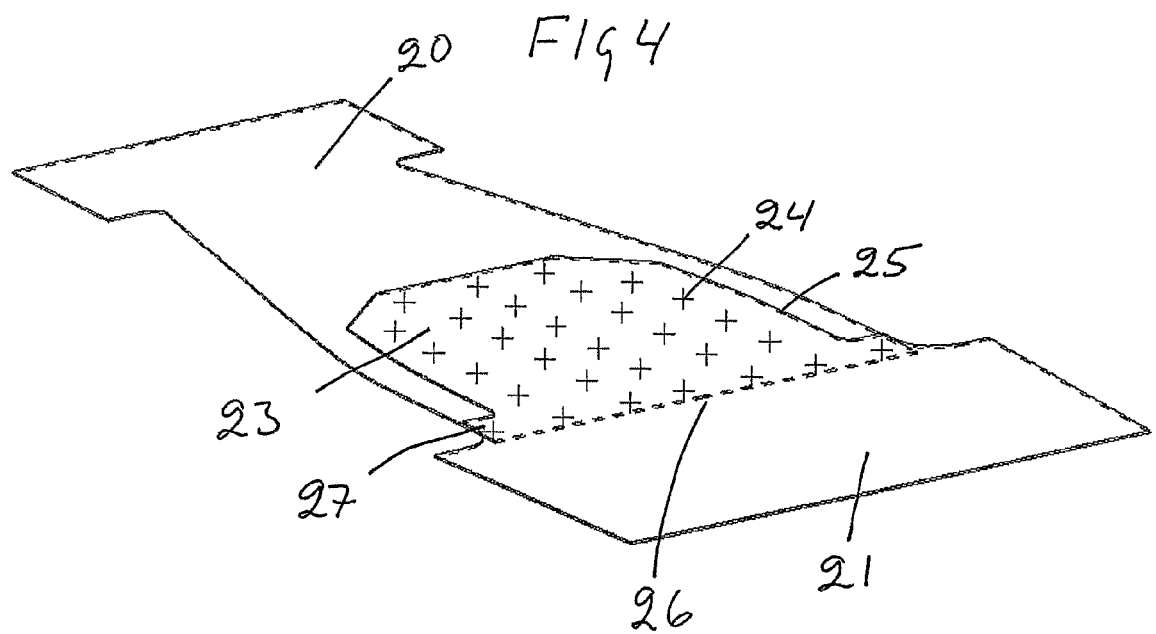
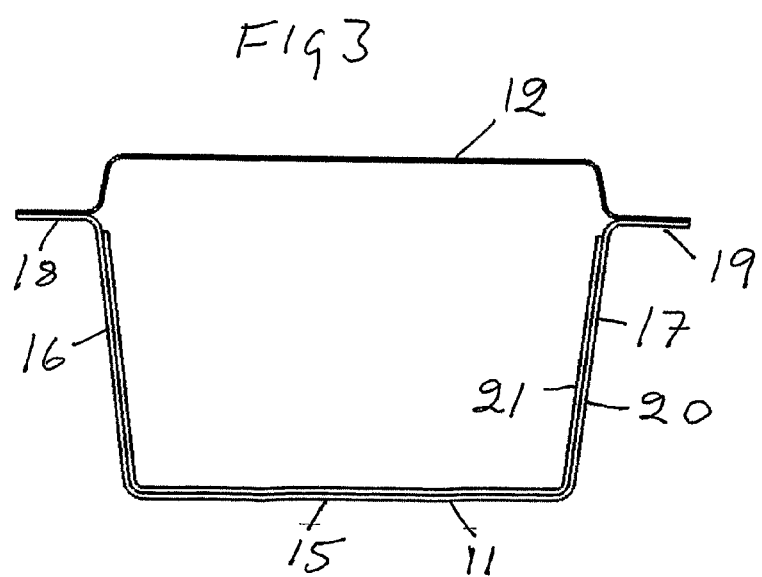

METHOD OF HOT-STAMPING AND HARDENING AN OBJECT FROM A METAL SHEET, AND A B-PILLAR FOR A VEHICLE

TECHNICAL FIELD

The present invention relates to a method of hot-shaping from a sheetmetal blank and hardening a sheetmetal object in a cooled tool, at which there is double sheetmetal in part of the blank and the whole blank is shaped in a single forming operation. The invention also relates to a B-pillar for a vehicle.

STATE OF THE ART

Shaping a sheetmetal blank together with a reinforcing patch in order to create a product is known from EP 1195208 B1 and DE 4307563 A1.

OBJECT AND BRIEF DESCRIPTION OF THE INVENTION

An object of the invention is to provide greater possibilities for choosing freely different characteristics in different portions of a shaped product and to make it easy to achieve different degrees of hardness in different portions of a product formed from a planar sheet steel blank.

This is achieved by making the blank by placing together two blank elements with an overlap and welding them together before the shaping operation so that during that operation the portions with overlapping sheetmetal are shaped and hardened at the same time as the portions of the two blank elements which do not overlap in a single shaping operation. The invention is defined by the claims.

BRIEF DESCRIPTION OF THE DRAWINGS

FIG. 1 is a perspective view of a B-pillar for a vehicle depicted by way of example of the invention, showing the pillar as seen from outside the vehicle.

FIG. 2 is a perspective view of the B-pillar as seen from inside the vehicle.

FIG. 3 is a cross-section along the line 3-3 in FIG. 1.

FIG. 4 is a perspective view of the blank from which the B-pillar in the above drawings is formed.

DESCRIPTION OF THE ILLUSTRATED AND PREFERRED EMBODIMENT EXAMPLE

FIGS. 1-3 depict by way of example a B-pillar which comprises a hat beam section 11 and a cover 12. The hat beam section is enlarged upwards and downwards to form transverse hat sections 13,14 which are intended to be fastened to the vehicle in order to constitute a load-bearing element of the vehicle. The hat beam section 11 has a central flange 15, two webs 16,17 and two side flanges 18,19.

FIG. 4 depicts the sheet steel blank from which the hat beam section 11 is shaped. It comprises two blank elements 20,21 placed overlapping. FIG. 4 shows the blank element 21 which is to become the pillar's lower portion placed partly on top of the blank element 20 which is to become the upper portion of the pillar. The overlap portion 23 is spot-welded or stitch-welded at points distributed across the whole surface, as indicated by the crosses 24. In addition, the overlap edge is fully welded, i.e. both the edge 25 of the blank element 21 on top of the blank element 20, and the edge 26 of the blank element 20 under the blank element 21, thereby providing not only reinforcement but also protection against crevice corrosion. The edge need not necessarily be fully welded.

The welded-together blank 20,21 is heated in a furnace to austenitising temperature and is hot-shaped in a cooled tool pair, after which it is left with the tools serving as cooling fixtures. This combined shaping and hardening operation is a known process called press-hardening. It is possible to adopt for the upper blank element such a steel grade that the upper portion of the pillar fully hardens and to adopt for the lower blank element a steel grade which is only partly or not at all hardenable. The result is a pillar comprising three portions with different strengths, with a middle portion, the overlap portion, having the greatest strength and a lower portion the least strength. The portion between the hinge fastenings thus becomes the strongest portion. Only the lower portion of the pillar will be subject to corrosion, and the lower blank element 21 may be provided with corrosion protection, whereas the upper portion 20 may be without corrosion protection. Compared with cutting an integral blank, the amount of sheetmetal used is smaller, since the upper blank element 20 is narrower than the lower element and does not need such a broad sheet. The overall result is a B-pillar with desired impact characteristics which costs less than previously and is lighter in weight.

As well as adopting similar or different steel grades, it is also possible to adopt similar or different sheet thicknesses in the two blank elements 20,21.

The cover 12 is welded firmly to the hat beam's side flanges 18,19.

As illustrated in FIGS. 1 and 4, the side flanges constituted by the two blank elements 20,21 have a short overlap 27, whereas the remainder of the overlap portion of the blank 21 is narrower so that it forms no side flange in the overlap region. FIG. 3 depicts the hat beam's overlap portion and the portions constituted by the blank elements 20,21 with these reference notations. The upper blank element 20 is depicted in FIG. 3 on top of the lower element, but the blank 20,21 may alternatively be so formed that the lower blank element comes outermost.

Welding the two blank elements together to form a Taylor blank may with advantage be effected by remote laser welding both for the overlap edges and for the stitching across the overlap surface.

Although the making of a B-pillar is referred to by way of example, the invention is not limited to that product.

The invention claimed is:

1. A method of forming a shaped steel product from two blank elements, the steps of said method comprising:
  forming a final shaped product in a single shaping operation by placing together two blank elements (20, 21) with an overlap (23); each of said two blank elements having an inner edge and an outer edge such that an overlapping region of said two blank elements is defined between said inner edges thereof; selecting the two blank elements so that the overlapping region thereof is greater in strength than either of said two blank elements; welding said blank elements together before shaping; heating said welded blank elements to austenitizing temperature; and thereafter hot shaping and hardening the portions of the two blank elements which overlap simultaneously with hot shaping and hardening of the portions of the two blank elements which do not overlap in a cooled tool; wherein one of said blank elements defines a first end of said final product, the other of said blank elements defines a second end of said final product, and the overlapping portions of said first and second blank elements define an intermediate portion corresponding to said overlapping region of said final product having a strength greater than that of either said first or second ends of said final product.

2. A method according to claim 1, characterised by welding the two blank elements together by spot welds or seam welds (24) distributed across the overlapping region.

3. A method according to claim 1, characterised by welding the inner edges (25, 26) of said two blank elements together along the overlapping region.

4. A method according to claim 1, characterised by forming said final product using said two blank elements (20, 21) of different steel grades with different hardenabilities so as to provide said final product with areas of different strength.

5. A method according to claim 1, characterised by making a B-pillar for a vehicle by using one of said blank elements (21) with less hardenability than the other one of said blank elements (20) so that there are three areas of different strength along the length of the pillar.

6. A method according to claim 1, characterised by using said two blank elements of different thickness so as to provide said final product with areas of different strength.

7. A method according to claim 1, characterised by making a B-pillar for a vehicle by using one of said blank elements which is thicker than the other of said blank elements so that there are three areas of different strength along the length of said pillar.

8. A method according to claim 1, characterised by using said two blank elements of different widths so as to provide said final product with areas of different strength.

9. A method according to claim 1, characterised by making a B-pillar for a vehicle by using one of said blank elements which is wider than the other of said blank elements so that there are three areas of different strength along the length of the pillar.

10. A method according to claim 1, wherein said overlapping region is formed exclusively from said two blank elements without any separate reinforcing element.

11. A method according to claim 1, wherein said first and second ends of said final product have different strengths from each other and from said overlapping region.

12. A method of forming a B-pillar for a vehicle from two steel blank elements, the steps of said method comprising:
forming said B-pillar in a single shaping operation by placing together two steel blank elements (20, 21) with an overlap (23); each said blank element having an inner edge and an outer edge such that an overlapping region of said two blank elements is defined between said inner edges thereof; selecting the two steel blank elements so that the overlapping region is greater in strength than that of either of said two blank elements; welding said blank elements together before shaping; heating said welded blank elements to austenitizing temperature; and thereafter hot shaping and hardening the portions of the two blank elements which overlap simultaneously with hot shaping and hardening of the portions of the two blank elements which do not overlap in a cooled tool; wherein one of said blank elements defines a first end of said B-pillar, the other of said blank elements defines a second end of said B-pillar, and the overlapping portions of said two blank elements define an intermediate portion corresponding to said overlapping region of said B-pillar; said overlapping region of said B-pillar having a strength greater than that of either of said first or second ends of said B-pillar.

13. A method according to claim 12, wherein said overlapping region of said B-pillar is formed exclusively from said two blank elements without any separate reinforcing element.

14. The method according to claim 12, wherein said first and second ends of said final product have different strengths from each other and from said overlapping region of said B-pillar.

15. A method of forming a shaped steel product from two blank elements, the steps of said method comprising:
forming a final shaped steel product in a single shaping operation by placing together two steel blank elements (20, 21) having different strengths with an overlap (23); each said blank element having an inner edge and an outer edge such that an overlapping region of said two blank elements is defined between said inner edges thereof; welding said blank elements together before shaping; heating said welded blank elements to austenitizing temperature; and thereafter hot shaping and hardening the portions of the two blank elements which overlap simultaneously with hot shaping and hardening of the portions of the two blank elements which do not overlap in a cooled tool; wherein one of said blank elements defines a first end of said shaped steel product, the other of said blank elements defines a second end of said shaped steel product, and the overlapping portions of said first and second blank elements define an intermediate portion corresponding to said overlapping region of said shaped steel product; said first end, said second end and said intermediate portion of said shaped steel product each having different strengths, the two blank elements being selected such that said intermediate portion corresponding to said overlapping region of said shaped steel product has a strength greater than the strength of each of said first and second ends of said shaped steel product, and such that said shaped steel product has three regions of different strength.

16. The method as claimed in claim 15, wherein said shaped steel product is a B-pillar for a vehicle.

17. A method according to claim 15, wherein said overlapping region of said shaped steel product is formed exclusively from said two blank elements without any separate reinforcing element.

* * * * *